June 27, 1967 E. G. NICKELL 3,327,814
SHOCK ABSORBER
Filed Oct. 7, 1965
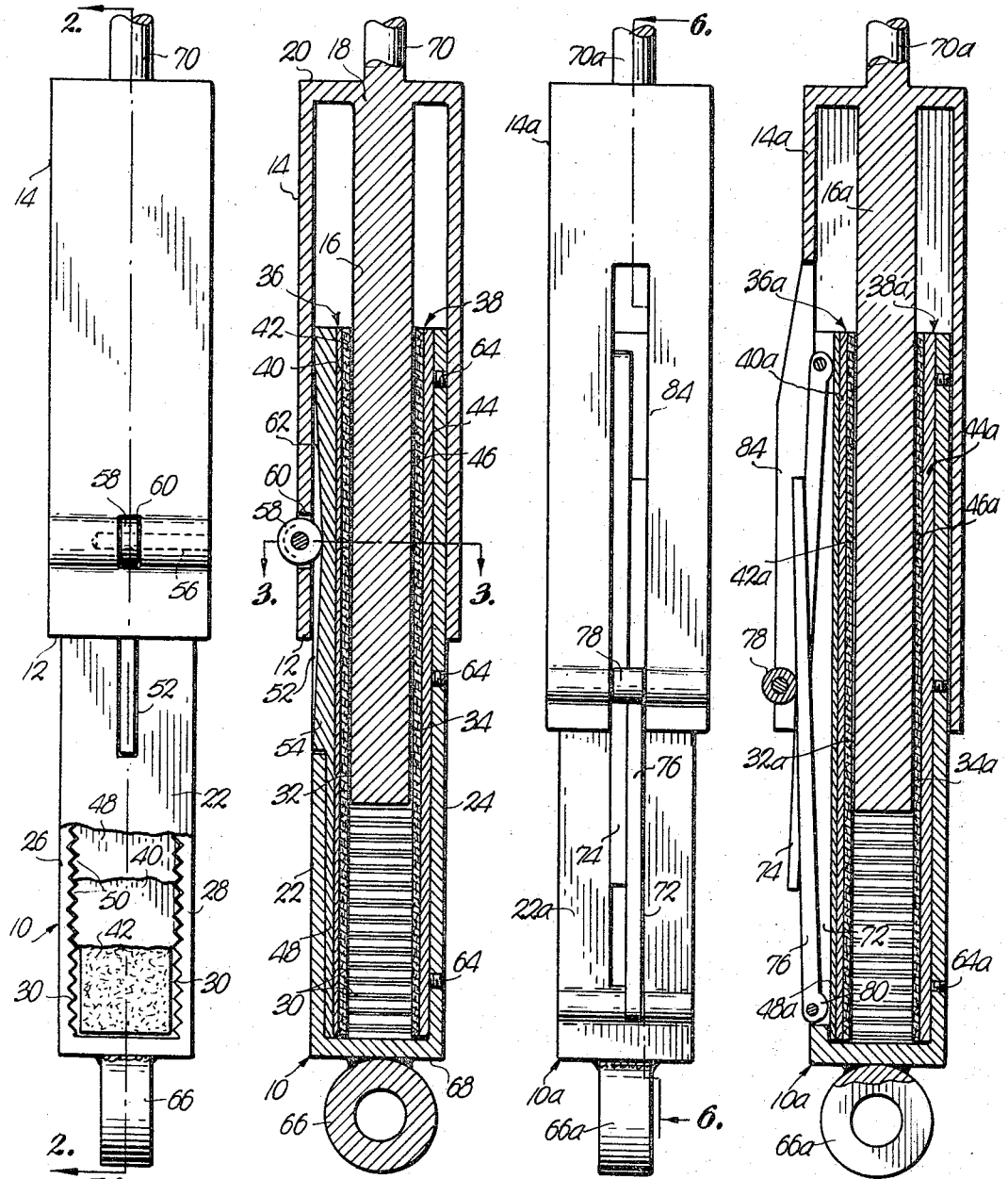
INVENTOR
Eldon G. Nickell
BY
ATTORNEYS

… …

3,327,814
SHOCK ABSORBER
Eldon G. Nickell, 1005 Broadway,
Kansas City, Mo. 64105
Filed Oct. 7, 1965, Ser. No. 493,858
3 Claims. (Cl. 188—129)

ABSTRACT OF THE DISCLOSURE

A shock absorber comprising a pair of relatively shiftable members with friction plates interposed between the members and cam or lever structure to mechanically force the friction plates into gripping engagement with one of the members to lock the members against further relative movement at either end of a rectilinear path of relative travel between the members.

This invention relates to a shock absorber in which the absorbing action is accomplished through the use of frictionally interengaging components, without the employment of a fluid as the shock absorbing medium.

The primary object of this invention is to provide a shock absorber which dampens the movement of a pair of relatively shiftable bodies, such as the frame and axle of a motor vehicle, through the use of mechanical components which absorb the shock in the absence of a fluid medium and which, therefore, is not subject to leakage and does not contain moving parts such as valves and the like necessary to the operation of hydraulic-type shock absorbers.

Another object of the instant invention is to provide a shock absorber which operates at a progressively faster rate as the degree of displacement of the two relatively shiftable bodies increases, and which is equally effective regardless of the direction of movement of such bodies.

A further object of the invention is to provide a shock absorber having instantaneous recovery, and which does not rely upon the operation of hydraulic valves or internal compression springs to effect return movement thereof after receiving a shock.

An additional object of the invention is to provide a non-fluid shock absorber as aforesaid constructed such that the entrance of foreign matter thereinto is minimized.

In the drawing:

FIGURE 1 is a side view of the preferred form of the invention, parts being broken away to reveal details of construction;

FIG. 2 is a longitudinal, sectional view taken along line 2—2 of FIG. 1;

FIG. 3 is a cross-sectional view taken along line 3—3 of FIG. 2;

FIG. 4 is a detailed, perspective, exploded view of the brake element;

FIG. 5 is a side view showing a modified form of the invention; and

FIG. 6 is a longitudinal, sectional view along line 6—6 of FIG. 5.

The numeral 10 designates a tube of square cross section telescoped within the open end 12 of an elongated, hollow case 14 of complemental configuration. An elongated member or bar 16 of rectangular cross section has an extremity 18 rigid with the closed end 20 of case 14, and extends longitudinally through the hollow case and into tube 10 along its longitudinal axis.

Tube 10 is provided with a pair of opposed rectangular wall sections 22 and 24, and a pair of opposed wall portions 26 and 28, each of the latter having a serrated, internal surface presenting a row of elongated teeth 30. The two rows of teeth 30 face one another and extend throughout the length of tube 10, each tooth running lengthwise in a direction in perpendicular relationship to the axis of tube 10 and the opposed, flat faces 32 and 34 of member 16. A primary brake element 36 of elongated, generally rectangular configuration extends adjacent face 32, while an elongated, secondary brake element 38 extends adjacent face 34.

Primary brake element 36 (FIG. 4) comprises a backing strip 40 bonded or riveted to a brake lining 42, secondary element 38 being of similar construction and comprising a backing strip 44 bonded to a brake lining 46. A pressure plate 48 extends between strip 40 and wall section 22, plate 48 and strip 40 having serrated, longitudinal edges 50 presenting teeth that are complementally received by teeth 30 (FIG. 1).

Wall section 22 is provided with a longitudinal slot 52 which receives a rib 54 integral with plate 48. A pin 56 mounts a cam 58 in the form of a roller in an aperture 60 in case 14. Roller cam 58 bears against the upper surface 62 of rib 54 (FIG. 2), surface 62 being angularly disposed with respect to the common longitudinal axis of tube 10 and case 14. The tube and the case are longitudinally shiftable along their common axis and are shown in their normal positions with cam 58 engaging the center portion of rib surface 62. It should be noted that surface 62 diverges from the aforesaid axis in directions away from the central portion thereof, thereby forming rib 54 into a pair of generally wedge-shaped sections which, in cooperation with cam 58, urge pressure plate 48 into forceful engagement with brake element 36 upon relative movement of tube 10 and case 14.

Three setscrews 64 are threaded into wall section 24 to enable adjustment of the disposition of secondary brake element 38 with respect to face 34 of member 16. In similar fashion to that as described above, the longitudinal edges of strip 44 are also serrated to present teeth which are complementally received by the teeth 30 of wall portions 26 and 28. A coupling ring 66 rigid with the closed, outer end 68 of tube 10, and a connecting rod 70 rigid with end 20 of case 14 serve as a means of attaching the shock absorber to the axle and frame of a motor vehicle.

Referring to FIGS. 5 and 6, components similar to those described above and shown in FIGS. 1–4 are designated by the same reference numerals with the addition of the "a" notation. In the modified form, wall section 22a has a longitudinal slot 72 therein extending substantially the entire length thereof, a pair of lever arms 74 and 76 being pinned to section 22a for pivotal movement toward and away from pressure plate 48a under the influence of roller cam 78 as tube 10a and case 14a are shifted relative to one another. Arm 76 is pivotally joined to section 22a at its left end and is provided with an eccentric projection 80 adjacent such end engaging the outer face of plate 48a. Similarly, arm 74 is pivoted at its right end and is provided with an eccentric projection 82 which also engages plate 48a. As illustrated, major portions of arms 74 and 76 lie within slot 72, the arms crossing midway between their pivotal connections. A longitudinal clearance opening 84 in case 14a allows free movement of tube 10a and case 14a toward and away from each other without interfering with arms 74 and 76.

The preferred form of the invention shown in FIGS. 1-4 operates as follows. Ring 66 and rod 70 are coupled with the vehicle suspension in the usual manner. As irregular surfaces, etc. are traversed by the vehicle, case 14 (and hence member 16) and tube 10 are shifted relative to one another along their common longitudinal axis. This shifts roller cam 58 and rib surface 62 relative to each other to force pressure plate 48 toward member 16, and thus cause frictional engagement of brake lining 42 with face 32. Because of the angular orientation of surface 62, the force with which lining 42 is brought into engagement with face 32 progressively increases as tube 10 and case 14 are moved away from the positions shown. Thus, a progressive increase in braking action is produced in accordance with the degree of displacement of tube 10 and case 14.

It is especially important to note that brake element 36 and pressure plate 48 shift longitudinally with tube 10, but that relative longitudinal movement of these components is precluded by the interengagement of teeth 30 and the serrated, longitudinal edges 50 of plate 48 and element 36. However, although tube 10, plate 48 and element 36 move longitudinally as a unit, movement of plate 48 and element 36 with respect to tube 10 transversely thereof is permitted by the orientation of teeth 30. Thus, plate 48 is free to force the brake lining 42 of element 36 into frictional engagement with face 32 under the action of cam 58 and surface 62 to dampen the shock transmitted to the absorber by the vehicle suspension.

Adjustment of setscrews 64 controls the spacing between brake lining 46 and face 34 and, therefore, determines the rate at which the absorber will react to the movement of tube 10 and case 14. For fast response, screws 64 are set such that lining 46 is brought into contact with face 34 when the components of the absorber are in their normal positions shown; therefore, a minimum of travel of tube 10 or case 14 initiates the progressive frictional gripping effect produced by the movement of pressure plate 48 caused by the action of cam 58 and rib surface 62.

The modified form of the absorber shown in FIGS. 5 and 6 may be utilized where additional leverage is desired to effect the braking action. The basic mode of operation of the modified absorber is the same as discussed above; however, force is now applied to pressure plate 48a by the eccentric projections 80 and 82 of arms 74 and 76. It will be appreciated that, as above, equal shock-absorbing action is obtained regardless of the direction of movement of tube 10a and case 14a since, depending on the direction of movement of these two components, arm 74 or arm 76 will be forcibly engaged by roller cam 78 to bring its eccentric projection to bear against plate 48a.

Having thus described the invention, what is claimed as new and desired to be secured by Letters Patent is:

1. In a shock absorber:
an elongated, longitudinally shiftable member;
a longitudinally shiftable tube telescoped over said member and having a normal position with respect thereto;
said tube having a wall section spaced from said member; a brake element frictionally engageable with said member and disposed in said tube between the member and said section;
a pressure plate between the section and the element, and structure coupled with the member and engaging said element for transmitting force to said plate to force the same into progressively increasing frictional engagement with said member as the latter and said tube are shifted relative to each other away from said normal position said tube having a pair of opposed wall portions interconnected by said section and provided with serrated internal surfaces, each presenting a row of elongated teeth extending transversely of said tube;
said element and said plate being of elongated configuration and having serrated, longitudinal edges complementally receiving said teeth, whereby to prevent movement of the element and plate longitudinally of the tube but permit movement of the same toward and away from said member.

2. In a shock absorber:
an elongated, longitudinally shiftable member;
a longitudinally shiftable tube telescoped over the member and having a normal position with respect thereto,
said tube having a wall section spaced from said member;
a brake element frictionally engageable with the member and disposed in said tube between the member and the section; a pressure plate between the section and the element; structure coupled with the member and engaging said element for transmitting force to said plate to force the same into progressively increasing frictional engagement with the member as the latter and said tube are shifted relative to each other away from said normal position; and
an elongated, longitudinally shiftable, hollow case having an open end receiving said tube, the member extending into the case longitudinally thereof, and having an inner extremity rigid with the case, whereby the member and the case are shiftable as a unit,
said structure including a cam carried by said case,
said plate being provided with means engaging the cam for shifting the plate toward said member in response to relative shifting of the member and the tube in either direction away from said normal position, whereby to effect said frictional engagement of the element with the member,
said case and said tube having a common longitudinal axis defining a line of movement of the member and the tube for said relative shifting thereof,
said cam projecting inwardly of the case,
said section having a longitudinal slot therein receiving the cam,
said plate shifting means comprising a rib rigid with the plate and received in said slot,
said rib having a cam-engaging surface diverging from said axis as the surface is traversed by the cam in either direction away from said normal position.

3. In a shock absorber:
an elongated, longitudinally shiftable member;
a longitudinally shiftable tube telescoped over the member and having a normal position with respect thereto,
said tube having a wall section spaced from said member;
a brake element frictionally engageable with the member and disposed in said tube between the member and the section;
a pressure plate between the section and the element;
structure coupled with the member and engaging said element for transmitting force to said plate to force the same into progressively increasing frictional engagement with the member as the latter and said tube are shifted relative to each other away from said normal position; and
an elongated, longitudinally shiftable, hollow case having an open end receiving said tube, the member extending into the case longitudinally thereof, and having an inner extremity rigid with the case, whereby the member and the case are shiftable as a unit,
said structure including a cam carried by said case,
said plate being provided with means engaging the cam for shifting the plate toward said member in response to relative shifting of the member and the tube in either direction away from said normal position, whereby to effect said frictional engagement of the element with the member, said element and said plate being of elongated configuration and extending longitudinally of said tube, said section having a longitudinal slot therein communicating with said plate and being provided with a pair of pivotal, crossed lever arms having pivot points spaced longitudinally of said section, each of said arms having a projection extending into said slot and engageable with said plate, said cam being disposed adjacent said open end of the case and normally engaging said arms at zones thereof where the arms cross, said case having a clearance opening between said cam and the opposite end thereof permitting said relative shifting of the member and the tube as the cam bears against said arms, thereby forcing said projections into pressure engagement with said plate.

References Cited

UNITED STATES PATENTS

| | | | |
|---|---|---|---|
| 1,153,531 | 9/1915 | Adams | 188—129 X |
| 2,139,666 | 12/1938 | Bogart | 188—129 X |
| 2,703,156 | 3/1955 | Depallens | 188—129 |
| 3,070,193 | 12/1962 | Depallens | 188—129 |

DUANE A. REGER, *Primary Examiner.*